United States Patent Office
3,174,984
Patented Mar. 23, 1965

3,174,984
3-HYDROXY AND ACYLOXY-6,16-DIALKYL-17-OXYGENATED-20-KETOPREGNENES
Robert P. Graber, Minneapolis, and Susumu Nakanishi, Hopkins, Minn., assignors to General Mills, Inc., a corporation of Delaware
No Drawing. Filed Dec. 13, 1962, Ser. No. 244,255
12 Claims. (Cl. 260—397.4)

This invention relates to the 3-hydroxy or acyloxy-6,16-dialkyl - 17 - oxygenated 20-ketopregnenes, pregnadienes, and pregnatrienes and their method of preparation.

These products are members of the steroid class of sex hormones which includes progesterone. This class of substances is of clinical value for the prevention of habitual or threatened abortion, the treatment of dysmennorhoea, pre-menstrual tension, as ovulation-suppressing agents and other sex cyclic regulatory purposes.

In addition to their usefulness in themselves as highly active progestational hormones, the 3-hydroxy or acyloxy-6,16-dialkyl-17-oxygenated 20-ketopregnenes, pregnadienes, and pregnatrienes are valuable intermediates in the preparation of other steroids. The compounds are of great value for the chemical and/or microbiological conversion to the anti-inflammatory corticoid hormones, for example, by the introduction of oxygen into position 11 of the molecule by fermentation with known microorganisms to provide an 11-hydroxy compound in which the 11-hydroxy group may be further oxidized chemically to a ketone group.

The 3-hydroxy and acyloxy-6,16-dialkyl-17-oxygenated 20-ketopregnenes, pregnadienes, and pregnatrienes are, accordingly, active progestational agents in themselves and further useful as valuable intermediates to research chemists for conversion to other progestogens or corticoid hormones.

It is therefore an object of this invention to prepare novel active steroid compounds of the formula

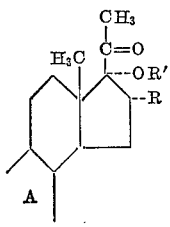

where A is selected from the group consisting of

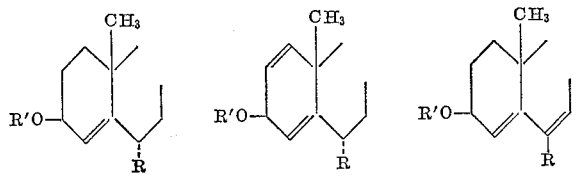

and

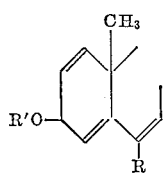

R is an alkyl group having from 1 to 8 carbon atoms and R' is selected from the group consisting of H and

where R" is an alkyl, cycloalkyl, aralkyl or alkoxyaralkyl group in which the alkyl group generally has from 1 to 12 carbon atoms and the aryl group is generally phenyl.

It is also an object of this invention to provide a method of preparing such products.

Briefly, the products of this invention are prepared by reduction of the 3-ketone group of the starting material to a 3-hydroxy group, followed, if desired, by acylation of the resulting 3-OH group.

The starting materials employed are illustrated by the following structural formula:

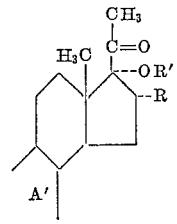

where A' is selected from the group consisting of

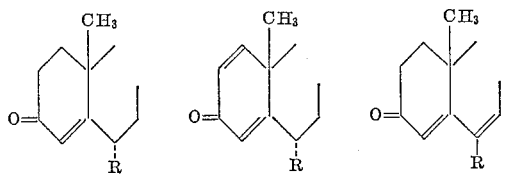

and

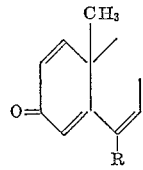

R is an alkyl group having from 1 to 8 carbon atoms and R' is selected from the group consisting of H and

where R" is an alkyl, cycloalkyl, aralkyl and alkoxyaralkyl group in which the alkyl group generally has from 1 to 12 carbon atoms and the acyl group generally is phenyl. Illustrative of the ester groups are the acetate, trimethyl acetate, diisopropyl acetate, cyclophentyl propionates, phenyl propionates, p-propoxyphenyl propionate, p-hexoxyphenyl propionate, p-dodecoxyphenyl propionate and the like. Illustrative of the alkyl groups, R, are methyl, ethyl, propyl, butyl, amyl, hexyl, heptyl and octyl.

The starting materials are known and may be prepared by any of the known methods of preparation thereof. Illustrative thereof are Belgian Patent 613,688 and commonly assigned U.S. application Serial No. 122,092, filed February 21, 1961, now U.S. Patent No. 3,123,660, the disclosures of which are hereby incorporated by references.

As indicated previously, the 3-ketone group of the starting materials is selectively reduced to the 3-hydroxy group. This is accomplished by treatment of a solution of the starting material with an excess of an alkali metal borohydride. The reaction is conducted at room temperature although other temperatures are substantially as effective providing the time of reaction is suitably increased or decreased dependent on the temperature employed. After the lapse of the necessary time to achieve substantially complete reduction of the 3-ketone group, which may be determined by removal and examination of samples, the reaction mixture may be worked up in the conventional manner to recover the 3-hydroxy product. One means of doing this is to pour the reaction mixture into ice and water, or alternately dilute with ice and water followed by destruction of the excess reducing agent by the addition of an acid such as acetic acid. The product separates as a solid which may be removed by filtration, washed and dried. It may then be purified by crystallization and/or by chromatography over neutral alumina. In all cases the 3β-hydroxy compound is the predominant product.

As indicated, a solution of the starting material is treated with the excess alkali metal borohydride. The preferred solvent for solution of the starting material is isopropyl alcohol. However, other alcoholic solvents may be employed, such as the aliphatic straight or branched chain hydrocarbon alcohols having from 1 to 12 carbon atoms. Other organic solvents, particularly nitrogen containing solvents, however, may be employed such as organic aliphatic and aromatic heterocyclic nitrogen containing bases and organic amides, i.e., pyridine and dimethyl formamide if it does not adversely affect the borohydride.

As the alkali metal borohydride, sodium borohydride is preferred. Potassium and lithium borohydrides may be employed, however. In general, any reducing agent selective for 3-ketone reduction could be employed. The alkali metal borohydrides are, however, preferred.

If desired, the 3-hydroxy group may be acylated in the usual manner. The acylated products may be isolated in the usual manner and purified by crystallization or chromatography.

The acylation is accomplished by treatment with the desired acid anhydride or acyl halide to provide the particular ester desired. Illustrative ester groups have been previously set forth hereinabove.

The following examples will serve to illustrate the invention. To avoid an undue number of examples, reference is made only to the dimethyl products and the acetate esters. The invention is not to be limited thereto and it is hereby understood that the invention is applicable to other alkyl groups and other esters as previously indicated. The particular alkyl groups do not interfere in the reaction and starting materials having any alkyl groups from 1 to 8 carbon atoms may be employed. This applies also to the 17-acyloxy groups present in the starting material.

*Example I*

To a mixture of 1.196 g. of 6,16α-dimethyl-17α-acetoxy-6-dehydroprogesterone and 30 ml. of isopropyl alcohol was added 227 mg. of sodium borohydride. The mixture was stirred at room temperature for five hours and 15 minutes; during the first one and one half to two hours, the solids originally present slowly dissolved to give a clear solution. At the end of above reaction time, the solution was poured slowly into 300 ml. of an ice-water mixture containing 2.5 ml. of glacial acetic acid. Gas was evolved and solid separated. The suspension was stored at ca. 5° C. overnight and then filtered. The solid product was washed thoroughly with water and dried in vacuum at room temperature, weight 1.190 g., $\lambda\lambda^{CCl_4}_{max.}$ s. 79μ (hydroxyl), 5.73μ (acetate carbonyl), 5.83μ (20-carbonyl), 8.04μ (acetate)

No bands for the 3-ketone of the 3-keto-4,6-diene system were present.

A 500.4 mg. portion of the product above was dissolved in 20 ml. of 1:1 benzene:hexane and placed on a column of 30 g. of neutral alumina. Seven 20 ml. portions of 1:1 benzene:hexane were passed through the column. The traces of residue on evaporation were oily and were discarded. Passage of 20 ml. portions of benzene through the column brought through increasing amounts of colorless oil up to fraction 12 after which the amounts in each succeeding fraction gradually decreased. A total of nineteen 20 ml. portions of benzene were used. Then mixtures of ether in benzene were passed through the column as follows: 3–20 ml. portions of 5% ether in benzene, 3–20 ml. portions of 10% ether in benzene, 3–20 ml. portions of 25% ether in benzene, 3–20 ml. portions of 50% ether in benzene, 3–20 ml. portions of 100% ether. The passage of the foregoing fractions brought through a total of 463 mg. of material. Fractions 11 through 38 crystallized and were combined, weight 424 mg. This material was recrystallized twice from ether-petroleum ether (B.P. 30–35° C.) to give the substantially pure material, 6,16α-dimethyl - 4,6 - pregnadiene - 3β,17α - diol - 20 - one 17 - acetate, M.P. 161.5–165°. Thin layer chromatographic analysis showed this material to be substantially a single substance.

*Example II*

Acetylation of 6,16α-dimethyl-4,6-pregnadiene-3β,17α-diol-20-one 17-acetate. Samples of the dimethyldiolone 17-monoacetate as follows, 62 mg. of M.P. 152–159° and 53 mg. of M.P. 161–165°, were combined and acetylated with 0.5 ml. of acetic anhydride in 0.5 ml. of pyridine overnight at room temperature. The acetylation mixture was worked up by the addition of crushed ice. Oily material separated which was extracted with two portions of ether. The combined extracts were washed successively with water (twice), 0.5 N hydrochloric acid, water (twice), 5% aqueous sodium bicarbonate solution, water (twice), and finally with saturated salt solution. The washed extracts were filtered through anhydrous magnesium sulfate and taken to dryness in vacuum at ca. 40° C. to give a colorless amorphous solid, weight 124.6 mg., $\lambda\lambda^{CCl_4}_{max.}$ 5.76μ (acetate carbonyl), 5.83μ (20-carbonyl), 8.08μ (acetate)

No hydroxy bands at 2.7–3.0μ were observed. The material was shown to be substantially a single substance by thin layer chromatography.

In the same manner as Example I by employing different starting materials in which the alkyl groups vary and the 17-ester groups vary, the following may be prepared:

6,16α-dimethyl-4,6-pregnadiene-3β,17α-diol-20-one 17-cyclopentylpropionate.
6,16α-diethyl-4,6-pregnadiene-3β,17α-diol-20-one 17-phenylpropionate.
6,16α-dimethyl-4,6-pregnadiene-3β,17α-diol-20-one 17-p-propoxyphenylpropionate.
6,16α-diethyl-4,6-pregnadiene-3β,17α-diol-20-one 17-p-dodecoxyphenylpropionate.
6,16α-dioctyl-4,6-pregnadiene-3β,17α-diol-20-one 17-acetate.
6-methyl-16α-octyl-4,6-pregnadiene-3β,17α-diol-20-one 17-acetate.
6-octyl-16α-methyl-4,6-pregnadiene-3β,17α-diol-20-one 17-propionate.
6α,16α-dimethyl-4-pregnene-3β,17α-diol-20-one 17-acetate.
6α,16α-dioctyl-4-pregnene-3β,17α-diol-20-one 17-acetate.
6α-methyl-16α-octyl-4-pregnene-3β,17α-diol-20-one 17-acetate.
6α,16α-dimethyl-4-pregnene-3β,17α-diol-20-one 17-cyclopentylpropionate.
6α,16α-dimethyl-4-pregnene-3β,17α-diol-20-one 17-p-propoxypentylpropionate.
6α,16α-dimethyl-1,4-pregnadiene-3β,17α-diol-20-one 17-acetate.
6α-methyl-16α-octyl-1,4-pregnadiene-3β,17α-diol-20-one 17-acetate.
6α,16α-dimethyl-1,4-pregnadiene-3β,17α-diol-20-one 17-cyclopentylpropionate.
6α,16α-dimethyl-1,4-pregnadiene-3β,17α-diol-20-one 17-p-propoxyphenylpropionate.
6α,16α-diethyl-1,4-pregnadiene-3β,17α-diol-20-one 17-acetate.
6,16α-dimethyl-1,4,6-pregnatriene-3β,17α-diol-20-one 17-acetate.
6,16α-diethyl-1,4,6-pregnatriene-3β,17α-diol-20-one 17-acetate.
6,16α-dimethyl-1,4,6-pregnatriene-3β,17α-diol-20-one 17-cyclopentylpropionate.
6,16α-dimethyl-1,4,6-pregnatriene-3β,17α-diol-20-one 17-p-propoxyphenylpropionate.

In the same manner as Example II, by employing the corresponding desired acylating agent, the following may be prepared:

6,16α-dimethyl-4,6-pregnadiene-3β,17α-diol-20-one 3-cyclopentylpropionate 17-acetate.
6,16α-dimethyl-4,6-pregnadiene-3β,17α-diol-20-one 3-phenylpropionate 17-acetate.
6,16α-dimethyl-4,6-pregnadiene-3β,17α-diol-20-one 3-p-dodecoxyphenylpropionate 17-acetate.
6,16α-diethyl-4,6-pregnadiene-3β,17α-diol-20-one 3-isobutyrate 17-phenylpropionate.
6-methyl-16α-octyl-4,6-pregnadiene-3β,17α-diol-20-one 3-phenylpropionate 17-acetate.
6-octyl-16α-methyl-4,6-pregnadiene-3β,17α-diol-20-one 3-methyl ethyl acetate 17-dipropionate.
6,16α-dimethyl-4,6-pregnadiene-3β,17α-diol-20-one 3,17-di-p-propoxyphenyl propionate.
6α,16α-dimethyl-4-pregnene-3β,17α-diol-20-one 3-methyl diethyl acetate, 17-diacetate.
6α-methyl-16α-octyl-4-pregnene-3β,17α-diol-20-one 3-phenylpropionate 17-acetate.
6α,16α-dimethyl-4-pregnene-3β,17α-diol-20-one 3,17-dicyclopentylpropionate.
6α,16α-dimethyl-1,4-pregnadiene-3β,17α-diol-20-one 3-triethyl acetate 17-diacetate.
6α,16α-dimethyl-1,4-pregnadiene-3β,17α-diol-20-one 3-acetate 17-cyclopentylpropionate.
6α,16α-diethyl-1,4-pregnadiene-3β,17α-diol-20-one 3-phenylpropionate.
6,16α-dimethyl-1,4,6-pregnatriene-3α,17α-diol-20-one 3-tertiary butyl acetate 17-diacetate.
6,16α-diethyl-1,4,6-pregnatriene-3β,17α-diol-20-one 3-p-dodecoxyphenylpropionate 17-acetate.
6,16α-dimethyl-1,4,6-pregnatriene-3β,17α-diol-20-one 3-acetate 17-p-propoxyphenylpropionate.

It is understood that the invention is not to be limited to the exact details of operation or the exact compounds shown and described as obvious modifications and equivalents will be apparent to those skilled in the art and the invention is to be limited only by the scope of the appended claims.

The embodiments of the invention in which an exclusive property or privilege is claimed are defined as follows:

1. A steroid compound selected from the group consisting of compounds of the formula

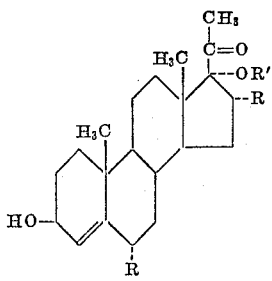

and the corresponding 1-dehydro, 6-dehydro and 1,6-bisdehydro derivatives thereof in which R is an alkyl group having from 1 to 8 carbon atoms and R' is selected from the group consisting of H and

where R'' is selected from the group consisting of alkyl, cycyloalkyl, aralkyl and alkoxyaralkyl groups in which the alkyl group has from 1 to 12 carbon atoms and the aryl group is phenyl.

2. A steroid compound as defined in claim 1 in which R is methyl.
3. A steroid compound as defined in claim 1 in which R' is H.
4. A steroid compound as defined in claim 1 in which R'' is methyl.
5. A steroid compound as defiined in claim 1 in which R' is H and R is methyl.
6. A steroid compound as defined in claim 1 in which R and R'' are methyl.
7. 6,16α.-dimethyl-4,6-pregnadiene-3β,17α-diol-20-one 17-acetate.
8. A steroid compound selected from the group consisting of compounds of the formula

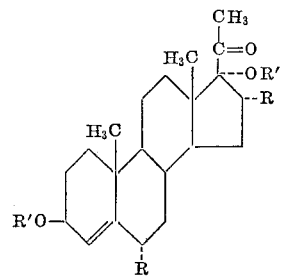

and the 1-dehydro, 6-dehydro and 1,6-dehydro derivatives thereof, in which R is an alkyl group having from 1 to 8 carbon atoms and R' is selected from the group consisting of H and

where R'' is selected from the group consisting of alkyl, cycloalkyl, aralkyl and alkoxyaralkyl groups in which the alkyl group has from 1 to 12 carbon atoms and the aryl group is phenyl.

9. A steroid compound as defined in claim 8 in which R is methyl.
10. A steroid compound as defined in claim 8 in which one R' is H and the other R' is

where R'' is selected from the group consisting of alkyl, cycloalkyl, aralkyl and alkoxyaralkyl groups in which the alkyl group has from 1 to 12 carbon atoms and the aryl group is phenyl.

11. A steroid compound as defined in claim 8 in which R is methyl and one R' is H and the other R' is

where R'' is selected from the group consisting of alkyl, cycloalkyl, aralkyl and alkoxyaralkyl groups in which the alkyl group has from 1 to 12 carbon atoms and the aryl group is phenyl.

12. 6,16α-dimethyl-4,6-pregnadiene-3β,17α-diol-20-one 3,17-diacetate.

References Cited in the file of this patent

Mancera et al.: J.A.C.S., 75, pp. 1286–90 (1953).
Pierce et al.: J.C.S., pp. 694–703, 1955.